UNITED STATES PATENT OFFICE.

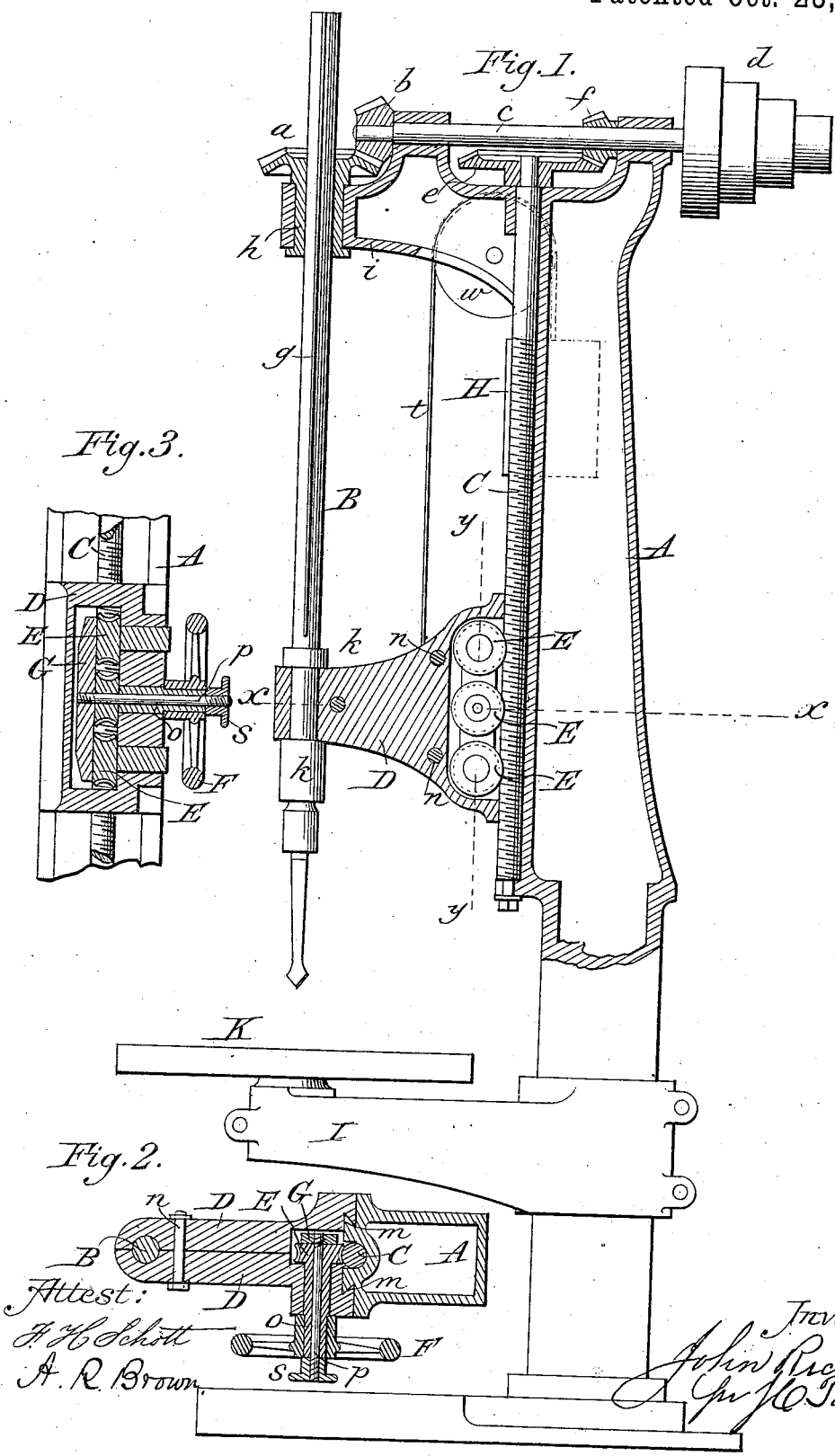
(No Model.)
J. RICHARDS.
DRILLING MACHINE.
No. 287,326. Patented Oct. 23, 1883.

JOHN RICHARDS, OF SAN FRANCISCO, CALIFORNIA.

DRILLING-MACHINE.

SPECIFICATION forming part of Letters Patent No. 287,326, dated October 23, 1883.

Application filed January 11, 1883. (No model.)

*To all whom it may concern:*

Be it known that I, JOHN RICHARDS, a citizen of the United States, residing at San Francisco, in the county of San Francisco and State of California, have invented certain new and useful Improvements in Metal-Drilling Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to machines for drilling metal; and it consists in feeding and adjusting the spindles of such machines by means of worm or tangent wheels gearing with a continuously-revolving screw placed parallel to the spindle, the screw and tangent-wheels performing the functions of feeding the spindle for drilling, and acting as a rack and pinion for rapidly adjusting the spindle when the drill is not operating.

The invention is illustrated in the annexed drawings, in which Figure 1 is a sectional side elevation of a drilling-machine embodying my improvements. Fig. 2 is a section on the line $x\,x$ of Fig. 1, and Fig. 3 is a section on the line $y\,y$ of Fig. 1.

Like letters of reference are used to designate the same parts in the several views.

A represents the main frame of the machine. B is the drilling-spindle, driven by the bevel wheels or gears $a\,b$, shaft $c$, and cone-pulley $d$, in the usual manner. A feed-screw, C, is supported in suitable bearings on the frame A, in a line parallel to the spindle B, and is also driven from the shaft $c$ by means of bevel wheels or gears $e\,f$, as shown in Fig. 1. The spindle B slides freely through the wheel $a$, and is provided with a feather, $g$, that fits a groove formed in the interior of the elongated hub $h$, that is attached to or formed with said wheel, the spindle being thus capable of rotating therewith. This hub $h$ has a bearing in a stationary bracket, $i$, at the upper end of the main frame.

At the lower end of the spindle B are formed collars $k\,k$, by which the spindle is supported in a bracket, D, that slides on the main frame A, by means of angular guides $m\,m$, as shown in Fig. 2. The bracket D is formed in two parts, that fit the spindle between the collars $k\,k$, and are detachably connected by means of bolts $n$, so that the spindle may be disconnected when desired. The opposite or inner end of the bracket D is recessed for the reception of the worm or tangent wheels E E E, which gear into the screw C, as shown in Figs. 1 and 2. These tangent-wheels are not necessarily connected by their axes, but act independently, except as combined by their meshing into the screw C. One of these tangent-wheels has a hollow spindle, $o$, that extends through the sliding bracket D far enough to receive a hand-wheel, F. It will be seen that by turning this hand-wheel F the bracket D and spindle B can be moved rapidly up or down, and thus adjusted to any desired position, the tangent-wheel and the screw operating the same as a rack and pinion.

A friction-clamp, G, is arranged within the bracket D, parallel to the tangent-gearing E, and is attached to a screw-shaft, $p$, that passes through the hollow spindle $o$ and carries a thumb-nut, $s$, by which the clamp G may be brought in close contact with the tangent-gearing for feeding the spindle B when drilling. It is obvious that by turning the thumb-nut $s$ so as to cause the friction-clamp G to bear against the sides of the tangent-wheels E, their movement will be arrested or retarded, thus causing a corresponding pressure to be exerted on the bracket D and spindle B, thereby feeding the drill. When the spindle B has been adjusted, by means of the hand-wheel F, to the position for drilling, the thumb-nut $s$ is screwed up to give the required pressure for feeding, the friction-clamp G permitting the wheels E E to revolve, however, when this pressure is exceeded, or in case of accident to the drill.

When the machine is employed for drilling large holes, the feed-screw C should be so geared as to feed the spindle at a proper speed; then the clamp G can be screwed up hard, and the wheels E E will act as a nut on the screw C, and give a positive movement to the bracket D and to the drill-spindle that is carried by said bracket. A single one of the wheels E, in connection with the shaft C, would perform the same functions of adjusting and feeding the drill, but does not present sufficient bearing-surface on the screw to accomplish the best results; hence several wheels are employed, the number depending upon the material of which they are made and the area of contact on their teeth.

The drill-spindle B and the sliding bracket D are balanced by a counter-weight, H, that is connected to the bracket by a cord, *t*, which passes over a pulley, *w*, as shown in Fig. 1.

The frame of the machine may be provided with an adjustable bracket, I, that carries a table, K, in the usual manner.

The operation of the machine will be readily understood. After the spindle B has been adjusted by means of the hand-wheel F, the thumb-nut *s* will be turned so as to cause the friction-clamp G to bear against the tangent-gearing E, and when power is applied to the cone-pulley *d*, causing the drilling-spindle B and the screw C to rotate, the rotation of the latter against the tangent-wheels, which then act as nuts, will feed the drill forward or downward.

Having thus described my invention, what I claim as new, and desire to secure by Letters Patent, is—

1. In a drilling-machine, the combination, with the drill-spindle, of a feed-screw arranged parallel thereto, a sliding bracket connected to the spindle, and a friction-clamp and tangent-gearing arranged in said bracket, substantially as described.

2. In a drilling-machine, the combination of a drill-spindle, a sliding bracket detachably connected thereto, a feed-screw, a friction-clamp, and tangent-gearing supported by said bracket, means for operating the tangent-gearing to adjust the drill-spindle, and means for operating the screw to feed the spindle, substantially as described.

3. In a drilling-machine, the combination, with the drill-spindle B, of the feed-screw C, sliding bracket D, tangent-gearing E, and friction-clamp G, substantially as described.

4. In a drilling-machine, the combination of the frame A, having guides *m m*, the sliding bracket D, engaging therewith, the drill-spindle B, supported by said bracket, the tangent-gearing E, friction-clamp G, screw C, and operating mechanism, substantially as described.

5. In a drilling-machine, the combination of the frame A, feed-screw C, sliding bracket D, tangent-gearing E, friction-clamp G, counter-weight H, drill-spindle B, shaft *c*, and gears *a b e f*, substantially as shown and described.

In testimony whereof I affix my signature in presence of two witnesses.

JOHN RICHARDS.

Witnesses:
  GEO. BINUL,
  ARTHUR BELL.